United States Patent

Study

Patent Number: 5,456,006
Date of Patent: Oct. 10, 1995

[54] METHOD FOR MAKING A HEAT EXCHANGER TUBE

[75] Inventor: Alan L. Study, Cologne, Germany

[73] Assignee: Ford Motor Company, Dearborn, Mich.

[21] Appl. No.: 299,971

[22] Filed: Sep. 2, 1994

[51] Int. Cl.⁶ .................................................. B73P 15/00
[52] U.S. Cl. ........................... 29/890.049; 29/890.053; 29/890.054
[58] Field of Search .................. 29/890.045, 890.049, 29/890.054, 890.053, 890.047

[56] References Cited

U.S. PATENT DOCUMENTS

| | | |
|---|---|---|
| 1,881,610 | 7/1930 | Hyde . |
| 2,096,272 | 10/1937 | Young . |
| 2,480,706 | 8/1949 | Brinen . |
| 3,089,226 | 5/1963 | Szöts et al. ............... 29/890.047 |
| 3,154,141 | 10/1964 | Huet . |
| 3,228,367 | 1/1966 | Donaldson ............... 29/890.047 |
| 3,432,905 | 3/1969 | Monroe ............... 29/890.047 |
| 3,734,135 | 5/1973 | Mosier . |
| 3,745,631 | 7/1973 | Jonason et al. ............... 29/890.054 |
| 3,809,155 | 5/1974 | Anthony et al. . |
| 3,875,997 | 4/1975 | Newson et al. . |
| 3,906,605 | 9/1975 | McLain . |
| 4,360,958 | 11/1982 | Kritzer . |
| 4,470,452 | 9/1984 | Rhodes . |
| 4,558,695 | 12/1985 | Kumazawa et al. . |
| 4,562,630 | 1/1986 | Larsson . |
| 4,570,700 | 2/1986 | Ohara et al. . |
| 4,805,693 | 2/1989 | Flessate . |
| 5,105,540 | 4/1992 | Rhodes . |
| 5,201,117 | 4/1993 | Wright ............... 29/890.053 |

Primary Examiner—Irene Cuda
Assistant Examiner—Marc W. Butler
Attorney, Agent, or Firm—Raymond L. Coppiellie; Roger L. May

[57] ABSTRACT

A method for making a tube for an automotive heat exchanger is disclosed. The method comprises the steps of feeding the tube stock and turbulator stock into the tube mill; forming the tube stock into a tube; and forming the turbulator stock into a generally elongated turbulator. The method further comprises the step of guiding the turbulator into the tube through an open end of the tube and welding a longitudinal seam along the open end of the tube to complete the fabrication thereof.

9 Claims, 2 Drawing Sheets

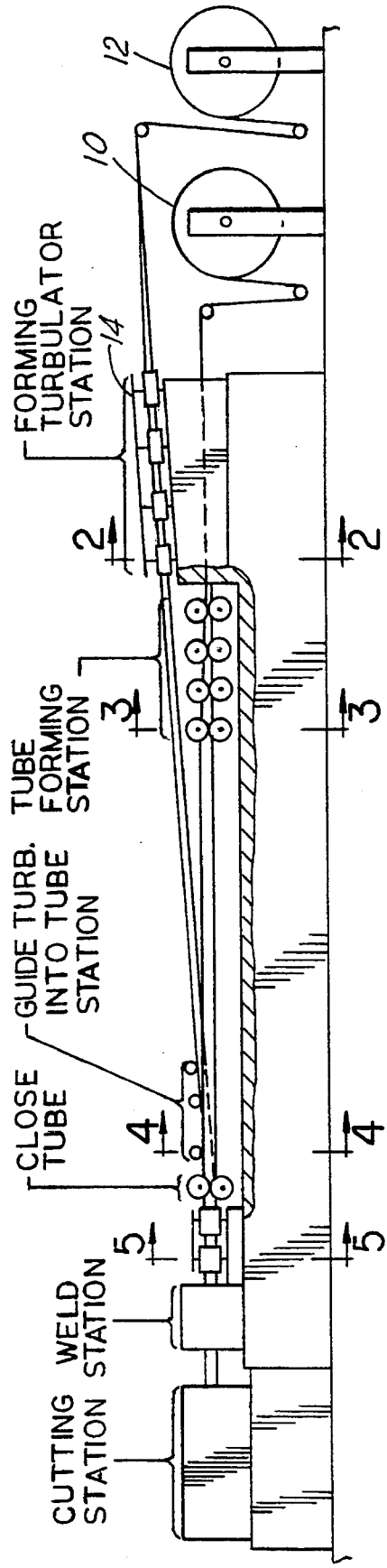
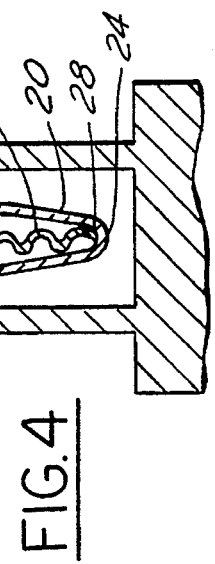
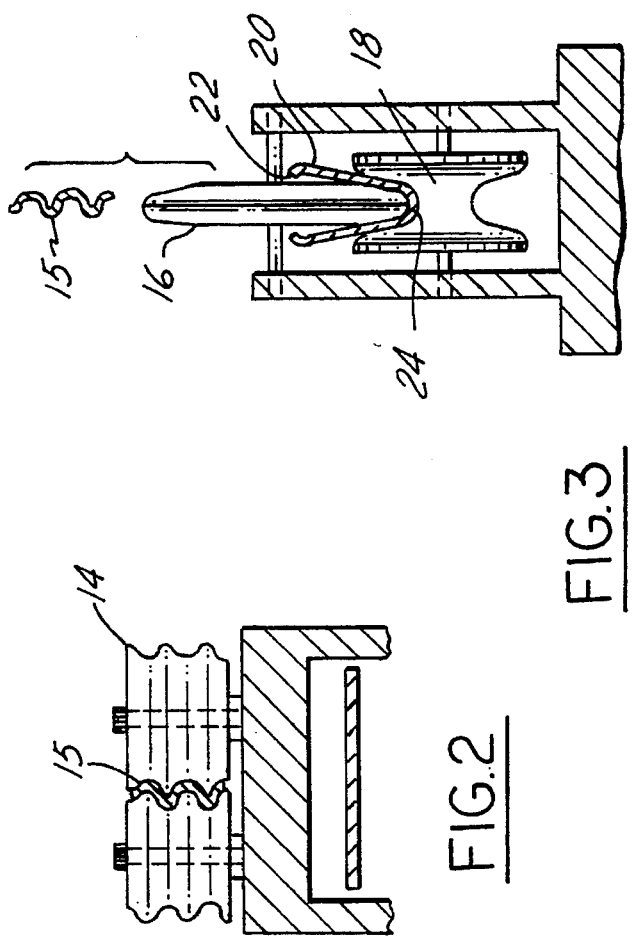

METHOD FOR MAKING A HEAT EXCHANGER TUBE

BACKGROUND OF THE INVENTION

1. Field of the Invention

The present invention relates to a method for making tubing for an automotive heat exchanger.

2. Disclosure Information

Designers of heat exchangers must consider a number of interconnected performance factors. For example, high heat transfer efficiency is promoted by turbulent flow within the fluid conducting tubes of the heat exchanger. However, such turbulence is usually achieved only at the cost of a high pumping loss, which may necessitate the use of considerable power to move fluid through the heat exchanger device. If, on the other hand, fluid is allowed to flow through the heat exchanging tubes in a quiescent manner, stratification will occur and the efficiency of the unit will be diminished.

Heat exchanger designers have employed a variety of methods for increasing turbulent flow through the tubes of a heat exchanger. One familiar technique involves the insertion of an additional element into the tube so as to promote turbulent flow. For example, U.S. Pat. No. 2,096,272 discloses an inserted turbulence promoting device. This type of turbulence promoting element suffers from a common drawback inasmuch as additional expense in the form of both labor and material is required to insert the turbulator strip into the tube assembly. In this type of assembly, the turbulator strip is pushed down the longitudinal length of the tube member. Scrap often occurs because of crimping of the turbulator while being pushed through the tube member.

Heat exchanger designers have attempted to avoid drawbacks associated with separate turbulator inserts by providing integral turbulence promoting features in heat exchanger tubes. For example, U.S. Pat. No. 1,881,610 discloses a heat exchanger tube structure in which the tube wall is worked in order to provide the turbulence promoting feature such as a plurality of indentations formed in the wall. Such a structure suffers from two potential drawbacks. First, in the event that the tube wall is of sufficient thickness so as to withstand the roughening process without resulting in any distortion of the outer surface of the tube, the heat transfer characteristics of the tube will be somewhat impaired by the thickness of the wall itself. Furthermore, the expense of the tube material will be increased because of the thicker wall.

It is an object of the present invention to provide a method for making a heat exchanger tube which provides good heat transfer characteristics and may be easily processed during the assembly thereof.

It is an advantage of the present invention that the heat exchanger tube according to this invention may be fabricated without additional labor costs associated with other types of turbulence promoting heat exchanger tubes.

Other objects, features and advantages of the present invention will become apparent from the following drawings and detailed description.

SUMMARY OF THE INVENTION

According to the present invention, a method for fabricating a tube for a heat exchanger comprises the steps of feeding tube stock and turbulator stock into a tube mill; forming the tube stock into a tube having an interior surface, the tube defining a closed end and open end; and forming the turbulator stock into a generally elongated turbulator. The method further comprises guiding the turbulator into the tube through the open end thereof, closing the open end of the tube and welding a longitudinal seam along the open end to complete the fabrication of the tube. The tube is then cut to a predetermined length.

The present invention further contemplates a method of making a heat exchanger having a tube fabricating according to the present invention.

BRIEF DESCRIPTION OF THE DRAWINGS

FIG. 1 is a schematic representation of a tube mill for making the heat exchanger tube according to the present invention.

FIGS. 2–5 are cross-sectional views taken along the respective locations of FIG. 1.

DETAILED DESCRIPTION OF THE PREFERRED EMBODIMENTS

Figure 5:
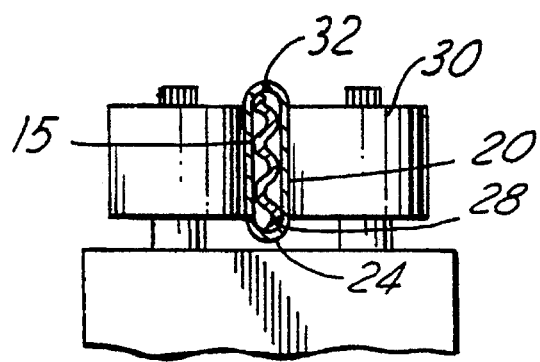

As shown in FIGS. 1–5, a heat exchanger tube according to the present invention is fabricated from separate rolls of tube stock 10 and turbulator stock 12. The rolls of turbulator stock are fed into form rolls 14 which configure the turbulator stock into a turbulator 15 having a generally sinusoidal wave configuration. However, the turbulator 15 can be formed into any of a number of different shapes or configurations depending upon the heat transfer characteristics to be achieved by the heat exchanger. As shown in FIG. 2, the turbulator 15 of the present invention is shaped as a sine wave in the dies 14.

As shown in FIG. 3, the tube stock 10 is fed sequentially through a set of form rollers as is known in the art to a final set of V-shaped rollers 16 which press the tube stock into a second V-shaped roller 18 to form a tube 20 having an open end 22 and a closed end 24.

As shown in FIG. 4, the turbulator 15 is then inserted through the open end 22 of the tube 20 by a guide 26 such that one end 28 of the turbulator 15 contacts the interior surface of the closed end 24 of the tube 20. The turbulator is guided into the tube at a minimal angle to ease the insertion process without damaging the turbulator. In the event that the turbulator must be brazed or metallurgically bonded to the interior of the tube, an in-line decreasing and or fluxing station may be required and presumably would be located between the sections defined by lines 3—3 and 4—4 of FIG. 1. In the present invention, the tube and turbulator assembly are performed as one operation which greatly reduces the labor costs associated with the prior art designs in which the turbulator was inserted manually through a closed tube member.

As shown in FIG. 5, the final tube assembly is formed by applying a force to the outer surface of the tube 20 by rollers 30 to close the open end of the tube. The tube 20 is then welded along a longitudinal seam 32 to complete the fabrication of the tube. The tube is then cut to a predetermined length depending upon the requirements of the heat exchanger to be manufactured. By closing and welding the tube after the insert is in place, improved turbulator to tube contact is made since no clearance must be provided to assemble the components as was necessary in previous designs. Because of the improved contact between the turbulator and the tube, improved heat transfer efficiency of the tube assembly is achieved. Furthermore, in the event that brazing the turbulator to the tube is required, the present invention provides improved brazing of the turbulator to the tube since fluxes are not scraped off the turbulator while inserting it through an already closed tube member as was done in the prior art.

The final preform of a tube according to the present invention is shown in FIG. 5. Note that the weld 32 has been applied along a longitudinal seam of the tube 20 to complete the fabrication of the tube.

The turbulator and tube may preferably be comprised of SAE 3003 aluminum alloy clad with SAE 4343 brazing alloy, with the turbulator comprising H18 cold rolled stock. For an automotive radiator of the type shown generally in FIG. 6, turbulator 15 will preferably comprise material which is very thin in the range of 0.003–0.004 inches in thickness. Those skilled in the art will appreciate in view of this disclosure that other types of metals clad with other types of brazing or soldering agents could be employed in the composite tubs according to the present invention.

Figure 6:
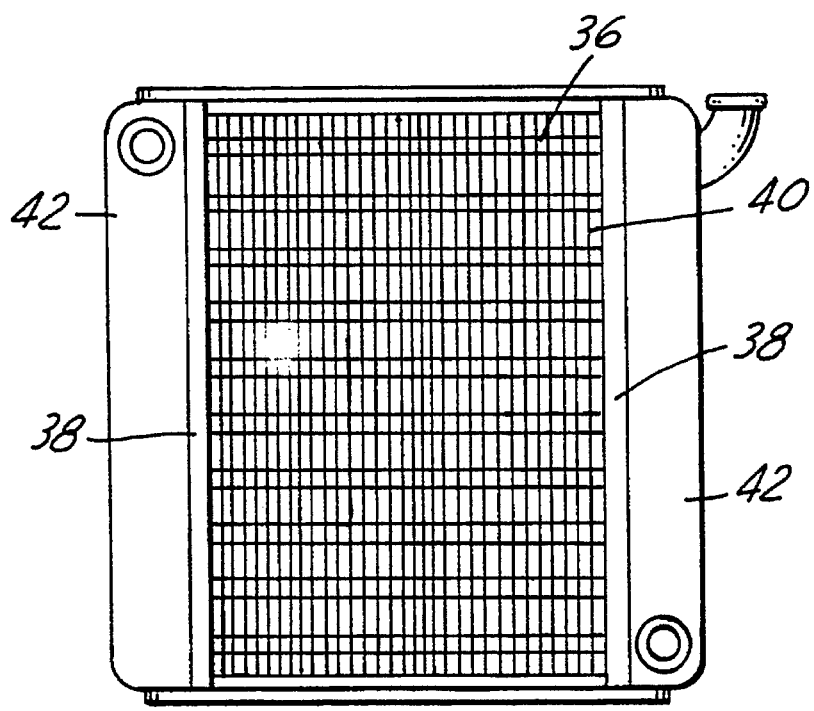
FIG. 6 is a partially schematic view of a heat exchanger according to the present invention.

FIG. 6 illustrates a heat exchanger assembly fabricated with tubes according to the present invention. According to a method for constructing a heat exchanger, a plurality of tube preforms 36 will be inserted into a header assembly 38 comprising a pair of headers. A plurality of fin members 40 are interleaved between the tube preforms prior to insertion of the tubes into the header assemblies 38. The resulting combination of tubes, fins and headers may then be brazed in a furnace. This will allow the tubes to be brazed into the headers while simultaneously brazing the turbulators to the tubes. Because the tubes have smooth untextured exterior surfaces, brazing tubes into the headers will be easily accomplished even without the use of brazed clad material for the tubes. Once the brazing has been completed, end tanks 42 may be added to complete the heat exchanger assembly.

Various modifications and variations will no doubt occur to those skilled in the arts to which this invention pertains. All such modifications and variations which basically rely on the teachings with which this disclosure has advanced the art are properly considered, then the scope of this invention is defined by the appended claims.

What is claimed is:

1. A method for fabricating a tube having a longitudinal length for a heat exchanger, comprising the steps of:

feeding tube stock and turbulator stock into a tube mill;

forming said tube stock into a non-closed tube having an interior surface, said tube defining a closed end and an open end along the longitudinal length thereof;

forming said turbulator stock into a generally elongated turbulator;

guiding said turbulator into said tube through said open end extending along the longitudinal length thereof;

welding a longitudinal seam along said open end of said tube to complete fabrication of and to define an interior diameter of said tube; and cutting the tube to a predetermined length.

2. A method according to claim 1, wherein the step of forming said turbulator includes the step of forming said turbulator such that said turbulator extends across generally the entire interior diameter of said tube.

3. A method according to claim 1, wherein the step of guiding said turbulator into said tube further includes the step of inserting said turbulator into said tube such that one longitudinal edge of said turbulator contacts said closed end of said tube.

4. A method according to claim 1, further including a step of brazing said turbulator to the interior of said tube.

5. A method according to claim 1, wherein said tube stock and said turbulator stock are formed from an aluminum alloy.

6. A method of making a heat exchanger having a tube having a longitudinal length including a turbulator disposed generally the entire longitudinal length thereof, comprising the steps of:

feeding tube stock and turbulator stock into a tube mill;

forming said tube stock into a non-closed tube having an interior surface, said tube defining a closed end and an open end along the longitudinal length thereof;

forming said turbulator stock into a generally elongated turbulator;

guiding said turbulator into said tube through said open end extending along the longitudinal length thereof;

welding a longitudinal seam along said open end of said tube to complete fabrication of and to define an interior diameter of said tube;

cutting said tube to a predetermined length;

assembling a plurality of said tubes of predetermined length into a header assembly;

interleaving a plurality of fin members between said plurality of tubes; and brazing said plurality of tubes and fin members to said header assembly while simultaneously brazing said turbulators to the interior of said tube.

7. A method according to claim 6, wherein the step of forming said turbulator includes the step of forming said turbulator such that said turbulator extends generally the entire interior diameter of said tube.

8. A method according to claim 7, wherein the step of guiding said turbulator into said tube further includes a step of inserting said turbulator into said tube such that one longitudinal edge of said turbulator contacts said closed end of said tube.

9. A method according to claim 8, wherein said tube stock and said turbulator stock are formed from an aluminum alloy.

* * * * *